(No Model.)  3 Sheets—Sheet 1.

A. WEYER.
GLASS POT FURNACE.

No. 398,296. Patented Feb. 19, 1889.

WITNESSES:
A. P. Wood
S. L. Hillyer

INVENTOR:
August Weyer
By Albert A. Wood
Attorney.

(No Model.) 3 Sheets—Sheet 2.

A. WEYER.
GLASS POT FURNACE.

No. 398,296. Patented Feb. 19, 1889.

WITNESSES:

INVENTOR:
August Weyer
By Albert A. Wood
Attorney.

(No Model.) 3 Sheets—Sheet 3.
A. WEYER.
GLASS POT FURNACE.
No. 398,296. Patented Feb. 19, 1889.
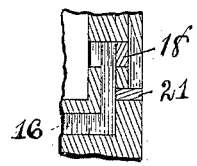
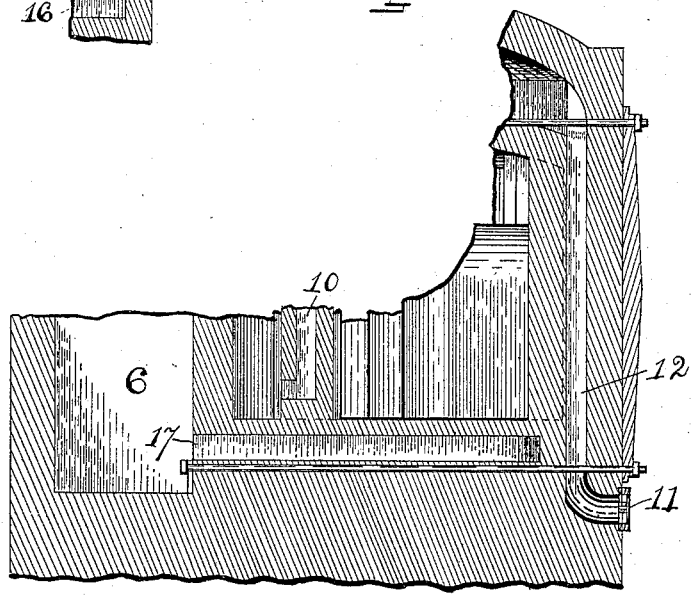
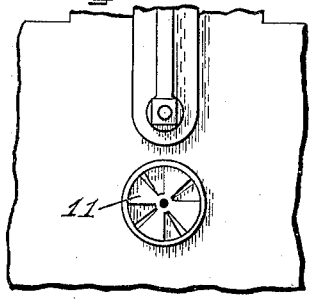
WITNESSES:
INVENTOR:
August Weyer
By Albert A. Wood
Attorney.

UNITED STATES PATENT OFFICE.

AUGUST WEYER, OF ATLANTA, GEORGIA.

GLASS-POT FURNACE.

SPECIFICATION forming part of Letters Patent No. 398,296, dated February 19, 1889.

Application filed May 20, 1887. Serial No. 238,906. (No model.)

*To all whom it may concern:*

Be it known that I, AUGUST WEYER, a citizen of the United States, residing at Atlanta, in the county of Fulton and State of Georgia, have invented a new and useful Glass-Pot Furnace; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to furnaces, and has for its object the more economical use of the fuel and increased durability in those parts of the furnace that are necessarily exposed to the heat.

The invention consists, therefore, of an improved construction whereby a current of air that has cooled and derived its heat from the lining and exposed parts of the furnace supplies oxygen to such a portion of the elements of the fuel as have not been supplied therewith at the time and place of their decomposition, the particulars of which will be hereinafter fully described as applied to a glass-furnace, and as illustrated in the accompanying drawings, of which—

Figure 1:
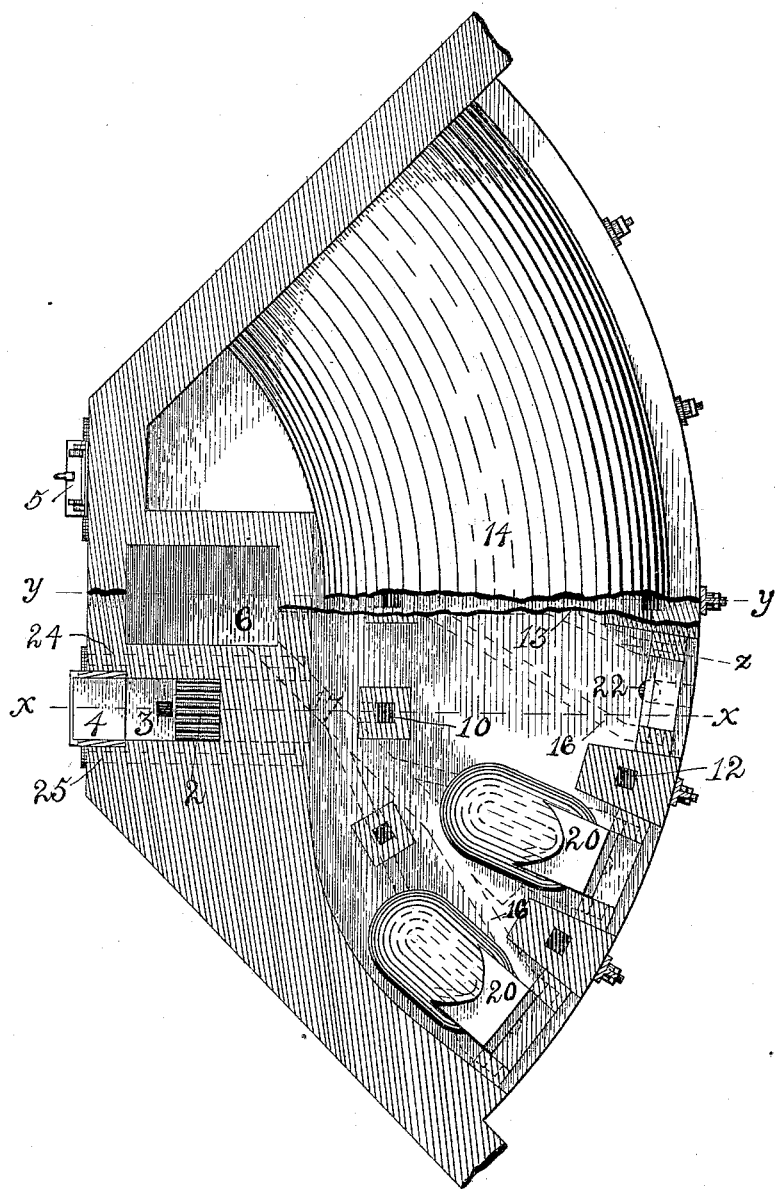
Figure 2:
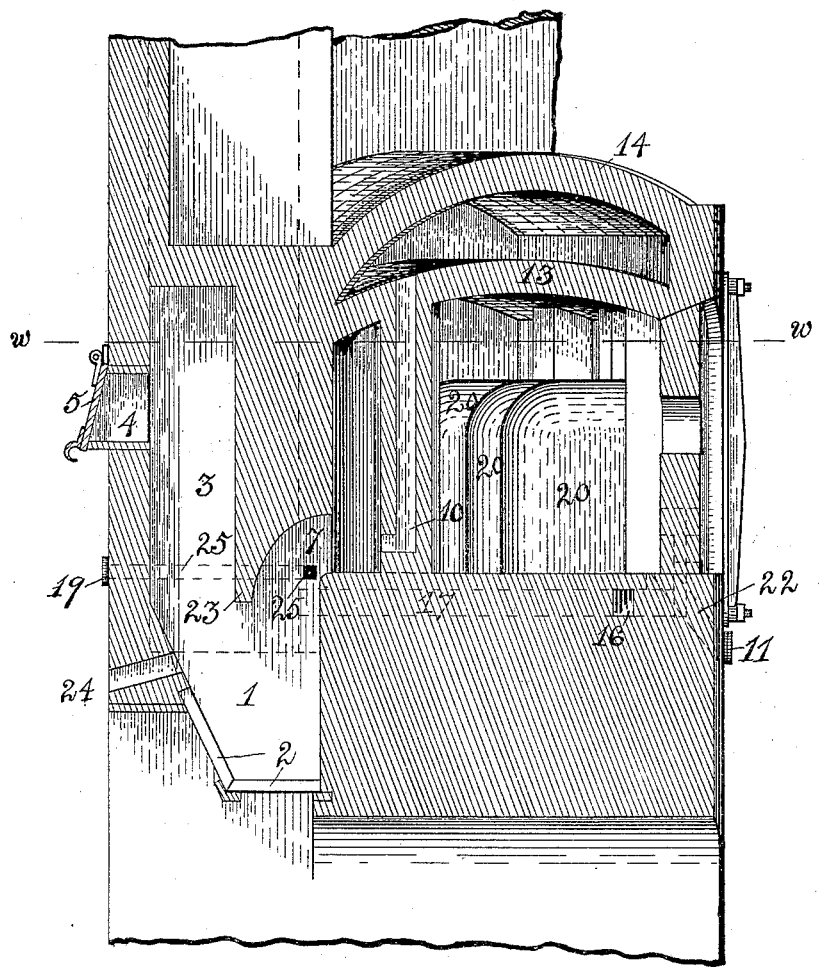

Figure 1 is a top view, partly in section, on the line *w*, Fig. 2, showing the fire-box, the reverberatory chamber, the flues, and the pots, except one pot, which is omitted in order to show the hole through which the contents of a broken pot will be discharged from the bench or floor of the furnace. The flues from this chamber to the chimney are shown by dotted lines. Fig. 2 is a vertical section on the line *x*, Fig. 1, showing most of the details. Fig. 3 is a section on the line *y*, showing an air-passage from the outside to the space between the arches and a flue leading to the chimney. Fig. 4 shows a register for the air-passages. Fig. 5 is a section on the line *z*, showing the connection of the flue under the bench, Fig. 1, with the reverberatory chamber.

In the figures, like reference-marks indicating corresponding parts in the several views, 1 represents the fire-box inclosed by walls and provided with grates 2.

3 is the coal-chute, and 4 is the opening through which the coal is fed to the chute, the opening being closed by the door 5.

The fire-box, chute, and feeding-aperture shown in Figs. 1 and 2 are exactly duplicated on the other side of the chimney 6, although more or less than two fire-boxes may be used; but it is found in practice that two is the preferable number. Each fire-box has an opening, 7, into the reverberatory chamber for the passage of the heat from the fire-box and the uncombined gases and other combustible matter that may escape.

In operating the furnace the fire in the fire-box is fed by the fuel in the chute, preferably employing bituminous coal, and by a sufficient quantity of air through the grate to insure the decomposition of the fuel and the combustion of the carbon. The gases, being driven from the fuel on its entrance into the fire-box, will enter the reverberatory chamber through the opening 7, with the heat from the fire in the fire-box, and come in contact with currents of air coming in through the flues 10, that will supply the oxygen necessary to the combustion of the gases. The air that is discharged through the air-flues 10 is taken in through the registers 11 and conducted by the flues 12, Figs. 1 and 3, to the air-space between the arches 13 and 14, with which the flues 10 also communicate. One of the flues 12 is in each of the columns between the pots in which the glass is melted, as shown in Fig. 1, and several of the columns, preferably the same number, containing the air-flues 10, are arranged with their discharge-openings toward the openings 7. The air in passing through the flues 12 over the arch 13 and through the flues 10 becomes very hot by the absorption of heat from the columns through which it passes and from the arch 13, and by so doing prevents the wasteful radiation of the heat from the outside of the furnace. The heated air being discharged into the reverberatory chamber near the opening from the fire-box will cause the combustion of all of the combustible matter that shall have entered the chamber from the fire-box, and will also return to the inside of the furnace a greater part of the heat that would otherwise have been radiated from the outside. The waste and unavailable products of combustion, after passing the pots 20, will enter the flues 16, (best shown in Figs. 2 and 5,) which pass downwardly and enter the main flues 17 under the floor or bench on which the pots 20 are placed. The mouth of the flues 16 should be at each side of the pots 20 and a little distance above the bench, in order that they may not carry off the contents of a broken pot, and is in the outer wall of the furnace between the columns, preferably starting with a horizontal hole entirely through the wall, the outer end of which may be stopped with a brick, 18, except when the hole is used for communication with the interior of the furnace. At some point in each flue 16 is a damper, 21, which may be a sliding brick, to close the flues from which it is desired to divert the heat, in case of a broken pot, for instance, or whenever, for any purpose, the heat is to be increased at one point by decreasing it at another.

The opening 22, extending from the interior to the exterior of the furnace, is for the purpose of carrying off the contents of a broken pot, one of which openings should be near each pot and should be stopped by a fusible or combustible plug that will yield to the heat of the contents of a pot and allow the said contents to escape, after which the aperture should be replugged.

Between the chute 3 and the opening from the fire-box to the reverberatory chamber is a downward projection, 23, of the wall for the purpose of preventing the fuel from being fed into the fire-box in such quantities as to obstruct this opening 7, and one or more openings, 24, should be through the front wall of the fire-box and chute for the purpose of allowing the fuel to be stirred to prevent its clogging; but these holes should be closed when not in use, and the fire-box and chute should be, as nearly as possible, air-tight, to prevent the escape of combustible gases in any other direction than into the reverberatory chamber, where they will meet and mix with the oxygen of the heated air that will be drawn in from the flues 10. For the purpose of insuring the inward circulation of the air through the flues 12, over the arch 13, and through the flues 10, the grate-opening should be as much only as will insure the combustion of the solid elements of the fuel, and the draft capacity of the chimney should be so much in excess of that of the grate-opening as will promote this inward circulation through the flues and over the arch, and also, if necessary, through the auxiliary flues 25, which are adapted to take the outer air through registers 19 directly into the opening leading from the fire-box into the reverberatory chamber to supplement any deficiency of the capacity of the flues 10 and 12 whenever there may be an excessive generation of gases or inflammable matter that is unconsumed in the fire-box.

For convenience of explanation and illustration I have shown and described this invention as applied to a furnace for melting glass; but it may be applied to furnaces for other purposes without a departure from the spirit of my invention.

Having thus described my invention, what I claim as new, and desire to secure by Letters Patent of the United States, is—

In a furnace consisting of one or more fire-boxes and a reverberatory chamber, the combination of air-flues in the wall of the side opposite the fire-box, registers at the outer end of these flues, the heating-chamber over the arched roof of said furnace, the columns which extend from said chamber to the bench near the ducts from the fire-boxes, these columns containing hot-air ducts which open into the reverberatory chamber just above the bench, and the bench, substantially as shown and described, for the purpose specified.

In testimony whereof I affix my signature in presence of two witnesses.

AUGUST WEYER.

Witnesses:
L. NOIZET,
A. BIOT.